Apr. 3, 1923.
C. H. WEIKERT ET AL
HAYSTACKER
Filed Oct. 5, 1920
1,450,271
3 sheets-sheet 1
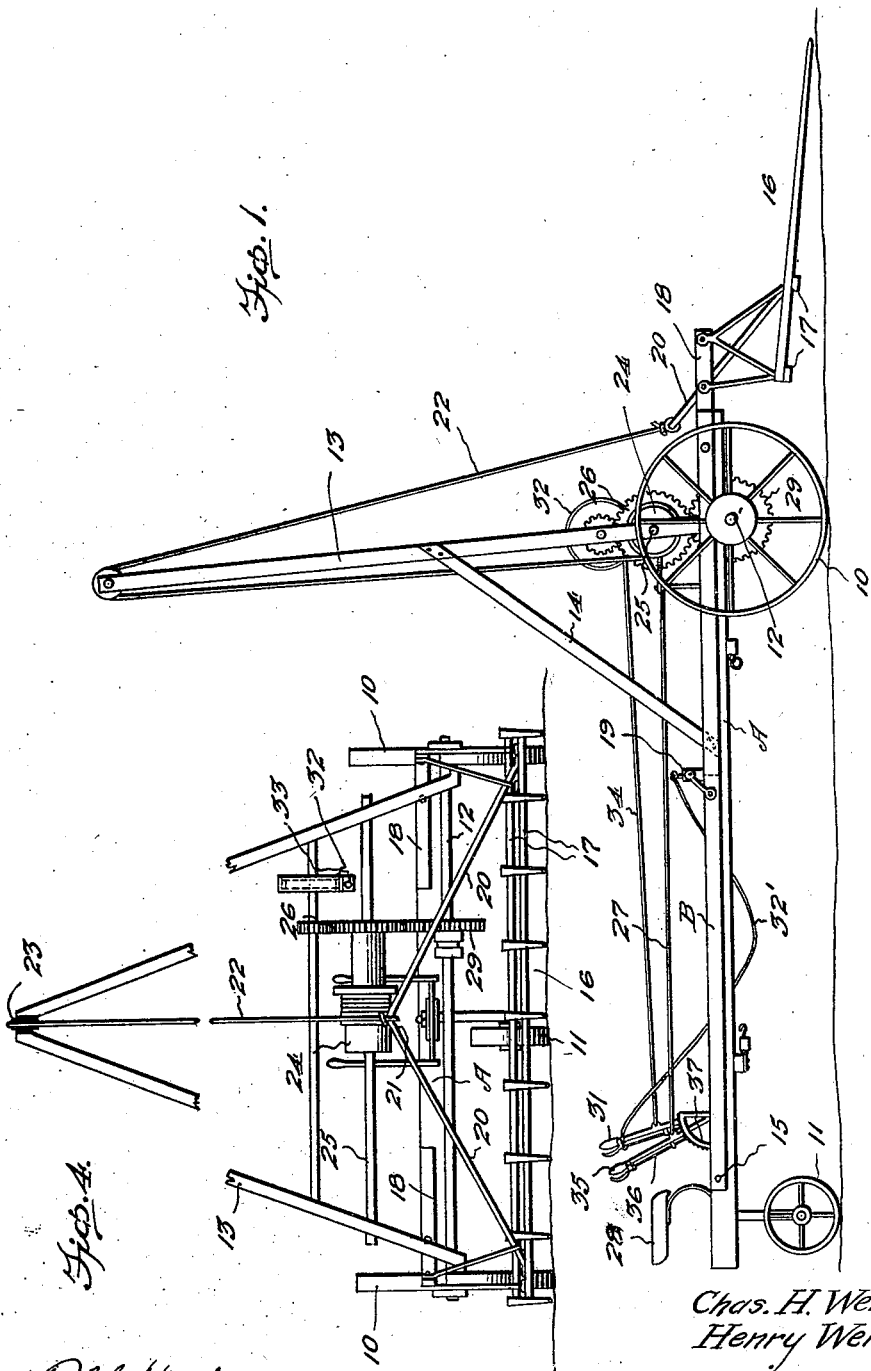
Chas. H. Weikert
Henry Weikert
INVENTOR
BY Victor J. Evans
ATTORNEY
WITNESS:

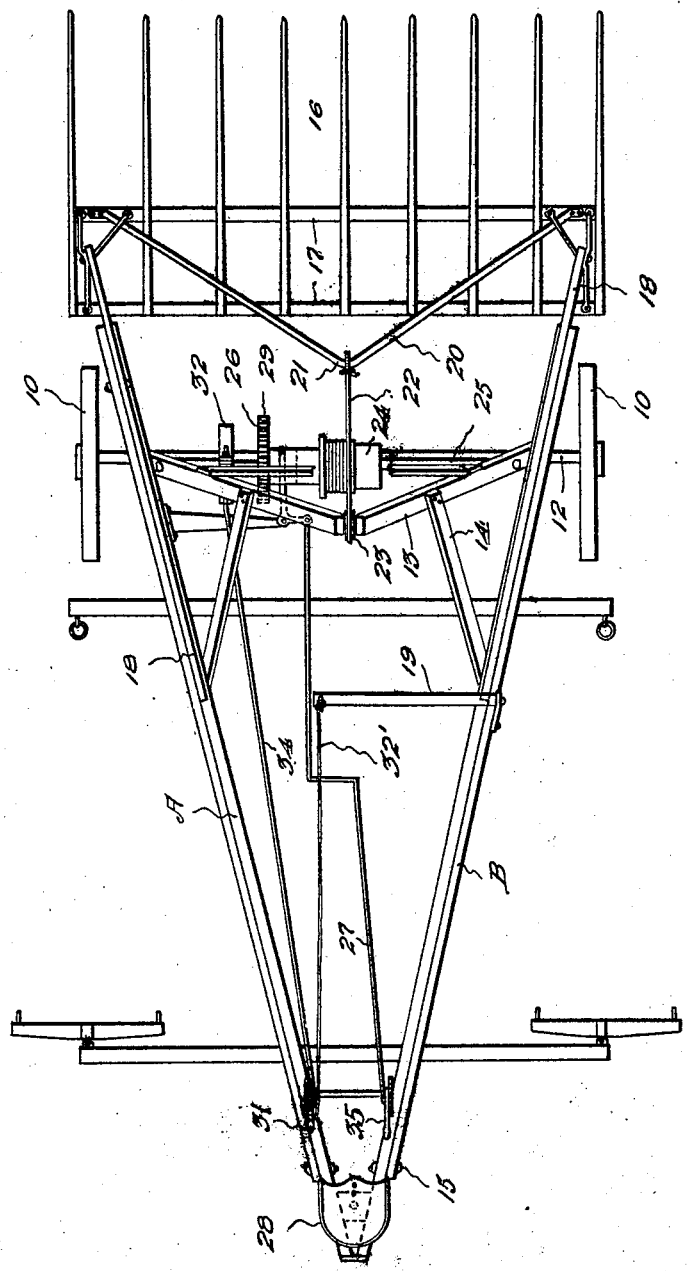

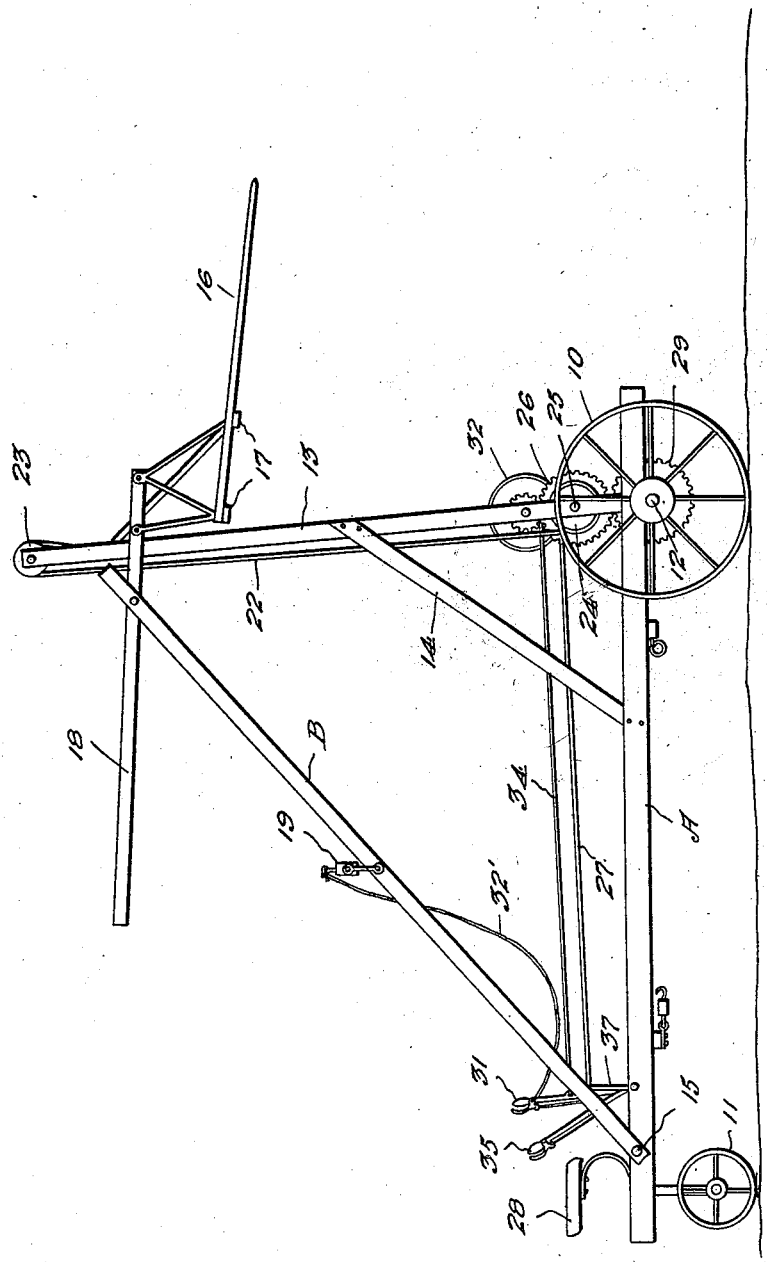

Patented Apr. 3, 1923.

1,450,271

UNITED STATES PATENT OFFICE.

CHARLES H. WEIKERT AND HENRY WEIKERT, OF VESTA, MINNESOTA.

HAYSTACKER.

Application filed October 5, 1920. Serial No. 414,932.

*To all whom it may concern:*

Be it known that we, CHARLES H. WEIKERT and HENRY WEIKERT, citizens of the United States, residing at Vesta, in the county of Redwood and State of Minnesota, have invented new and useful Improvements in Haystackers, of which the following is a specification.

This invention relates to hay stackers, and comprehends a construction wherein the rake is mounted upon a wheeled frame in a novel manner, so that it can be readily and easily elevated with its load, and subsequently tripped to deposit the load upon the stack.

The nature and advantages of the invention will be better understood when the following detail description is taken in connection with the accompanying drawings, the invention residing in the construction, combination and arrangement of parts as claimed.

In the drawings forming part of this application like numerals of reference indicate similar parts in the several views and wherein:

Figure 1 is a side elevation showing the parts normally disposed.

Figure 2 is a top plan view.

Figure 3 is a side elevation showing the rake elevated.

Figure 4 is an end elevation.

Referring to the drawings in detail, A indicates generally a wheeled frame of substantially V-shaped formation, the frame being supported by two front wheels 10 and a rear wheel 11 which is suitably connected with the small end of the frame. The axle for the front wheels is indicated at 12. A boom 13 rises from the sides of the frame adjacent the forward end thereof and is suitably braced by the elements 14 which connect the sides of the boom at a point in their length with the frame A. The purpose of the boom will be hereinafter described. An auxiliary frame indicated at B and of a configuration similar to the frame A is pivoted at its small end to the corresponding end of the frame A at 15. The sides of the auxiliary frame B project a slight distance beyond the forward extremity of the frame A and pivotally supports the rake 16. The rake 16 may be of any suitable construction and includes the spaced parallel members 17. Projecting from each side of the rake is an arm 18 which normally lies parallel with the sides of the auxiliary frame B, and in engagement with a pivoted trip element 19 supported by the auxiliary frame B. Divergently disposed rods 20 are terminally connected together as at 21, the opposite ends of these rods being secured to one of the parallel members 17 of the rake. A hoisting cable 22 has one end secured to the rods 20 at their point of connection, the cable being trained over a pulley 23 at the upper end of the boom, and connected with a drum 24 which is carried by a shaft 25 journaled between the sides of the boom in close proximity to the axle 12. Fixed to the drum at one end is a gear 26 and slidably mounted on axle 12 is a gear 29 which is controlled by a lever 35 disposed within convenient reach of the operator occupying seat 28. Lever 35 is connected by a link 27 to one arm of a bell crank lever which has its other arm engaged with the clutch collar of gear 29 for moving the latter into or out of mesh with gear 26. The drum may thus be rotated from the front axle 12 at the will of the operator. Pivoted within convenient reach of the operator is a lever 31 connected by means of the element 32' to the trip 19. Journaled in the boom 13 in parallelism with the drum shaft 25 to which it is geared, is a suitable brake shaft on which is provided a friction brake 32, the brake band of which has its ends connected for contraction or expansion by a rod 34 operable from the lever 31. This lever may be operated to apply the brake to hold the drum against rotation subsequent to elevating the rake. The lever 35 is provided with a pawl 36 cooperating with a ratchet 37 for this purpose.

In practice, the machine is moved over the ground or surface until the rake 16 gathers its capacity of hay, at which time the lever 35 is operated to throw the gear 29 into mesh with gear 26 of the drum. The drum is then actuated through the instrumentality of the gear 29 carried by the front axle, winding the cable 22 about the drum and lifting the auxiliary frame B together with the rake 16 to the position shown in Figure 3. While the auxiliary frame is being elevated, the arms 18 of the rake remain in engagement with the trip 19, whereby the rake is held fixed relatively to the auxiliary frame B and in a position to sustain its load of hay. When the auxiliary frame has been elevated the desired distance, the lever 31 is actuated to apply the brake 32, thereby holding the said auxiliary frame elevated. When it is desired to deposit the hay carried by the rake upon the hay stack, element 32' is actuated to move the trip element 19 out of engagement with the arms 18, thus permitting the rake to move upon its pivot to a position to allow the hay to gravitate from the rake. By releasing the brake 32 and disengaging the gear 29 from gear 26, the auxiliary frame is allowed to gravitate to normal position, during which time the cable unwinds from the drum. The construction of the machine is very simple, and can be conveniently handled in the manner and for the purpose described.

While it is believed that from the foregoing description the nature and advantages of the invention will be readily apparent, we desire to have it understood that what is herein shown and described is merely illustrative of one embodiment of the invention and that such changes may be resorted to when desired as fall within the scope of what is claimed.

What is claimed is:

A hay stacker comprising a pair of interfitting relatively pivoted frames having an opening and closing movement, one of said frames constituting a main stationary frame and the other an auxiliary frame, a rake pivotally supported from the said auxiliary frame, means for swinging the movable frame to a position above the main frame for elevating the said rake, an arm projecting from each side of the rake normally lying parallel with a side of the auxiliary frame, a pivoted trip-element mounted on the auxiliary frame and engaged over the said arms of the rake to hold the latter rigid with respect to the auxiliary frame, and an operator's lever connected with the trip-element for moving the latter to release the said arms.

In testimony whereof we affix our signatures.

CHARLES H. WEIKERT
HENRY WEIKERT.